United States Patent
Chou

(10) Patent No.: US 8,142,066 B2
(45) Date of Patent: Mar. 27, 2012

(54) MIXING DEVICE FOR SYNTHETIC LEATHER TO JOINT WITH A SOLID POWDER MATERIAL

(76) Inventor: Lung-Wen Chou, Longjing Township, Taichung County (TW)

(*) Notice: Subject to any disclaimer, the term of this patent is extended or adjusted under 35 U.S.C. 154(b) by 436 days.

(21) Appl. No.: 12/486,491

(22) Filed: Jun. 17, 2009

(65) Prior Publication Data
US 2010/0319856 A1 Dec. 23, 2010

(51) Int. Cl.
*B29B 7/00* (2006.01)
*B29B 7/86* (2006.01)
*B29C 47/10* (2006.01)
*B01F 7/16* (2006.01)
*B01F 13/02* (2006.01)
*B01F 15/02* (2006.01)

(52) U.S. Cl. ......... 366/76.6; 366/79; 366/83; 366/87; 366/91; 366/102; 366/156.1; 366/181.6

(58) Field of Classification Search ........... 366/101, 366/102, 156.1, 156.2, 157.2, 177.1, 181.6, 366/181.8, 76.6, 79, 83, 91, 87
See application file for complete search history.

(56) References Cited

U.S. PATENT DOCUMENTS

| | | | | |
|---|---|---|---|---|
| 3,650,510 A * | 3/1972 | Ansel | 366/160.3 |
| 3,776,702 A * | 12/1973 | Chant | 422/133 |
| 3,811,658 A * | 5/1974 | Heidrich | 366/76.9 |
| 3,892,389 A * | 7/1975 | Contastin | 366/138 |
| 3,920,223 A * | 11/1975 | Krueger | 366/156.2 |
| 4,201,485 A * | 5/1980 | Walker | 366/156.1 |
| 4,430,001 A * | 2/1984 | Schurr | 366/107 |
| 4,478,519 A * | 10/1984 | Guibert | 366/75 |
| 4,499,561 A * | 2/1985 | Mason et al. | 366/156.2 |
| 4,801,210 A * | 1/1989 | Gian | 366/156.2 |
| 5,547,276 A * | 8/1996 | Sulzbach et al. | 366/139 |
| 5,887,972 A * | 3/1999 | Dickmeiss et al. | 366/76.1 |
| 6,021,821 A * | 2/2000 | Wegman | 141/93 |
| 6,383,301 B1 * | 5/2002 | Bell et al. | 118/716 |
| 7,204,882 B2 * | 4/2007 | Chou | 118/259 |
| 7,329,374 B2 * | 2/2008 | Chou | 264/45.9 |
| 2005/0024988 A1 * | 2/2005 | Hoff et al. | 366/141 |
| 2006/0120212 A1 * | 6/2006 | Taniguchi et al. | 366/118 |
| 2006/0125135 A1 * | 6/2006 | Chou | 264/45.8 |
| 2006/0150898 A1 * | 7/2006 | Chou | 118/263 |
| 2008/0121342 A1 * | 5/2008 | Chou | 156/289 |
| 2009/0017214 A1 * | 1/2009 | Chou | 427/342 |
| 2009/0324833 A1 * | 12/2009 | Chou | 427/278 |
| 2010/0225019 A1 * | 9/2010 | Chou | 264/132 |
| 2010/0319856 A1 * | 12/2010 | Chou | 156/351 |

* cited by examiner

*Primary Examiner* — Tony G Soohoo
(74) *Attorney, Agent, or Firm* — Ming Chow; Sinorica, LLC

(57) ABSTRACT

A mixing device for synthetic leather to joint with a solid powder material includes a material mixing unit and a stirring and conveying unit. The material mixing unit includes a mixing body and two feeders. The mixing body is connected with the two feeders and has a mixing chamber therein which is intercommunicated with the two feeders. The stirring and conveying unit is connected with the material mixing unit and has a stirring and conveying chamber therein which is intercommunicated with a solid material container and the mixing chamber. Thereby, a solid powder material, a first material and a second material are respectively disposed in the solid material container and the feeders, and then guided into the mixing chamber to be well mixed for forming a mixture. The mixture is manufactured to form synthetic leather containing the solid powder material.

5 Claims, 4 Drawing Sheets

MIXING DEVICE FOR SYNTHETIC LEATHER TO JOINT WITH A SOLID POWDER MATERIAL

BACKGROUND OF THE INVENTION

1. Field of the Invention

The present invention relates to a mixing device for synthetic leather to joint with a solid powder material.

2. Description of the Prior Art

Synthetic leather is usually monotonous and dull without any variations in color and appearance. Thus, a consumer has no interest in the synthetic leather, which causes a lower value of its products. In order to solve this problem, it is necessary to vary the manufacture of the synthetic leather so as to enhance the purchasing desire to the consumer.

SUMMARY OF THE INVENTION

According to the present invention, there is provided a mixing device for synthetic leather to joint with a solid powder material, comprising:

a material mixing unit comprises a mixing body and at least two feeders, the mixing body being connected with the feeders and having a mixing chamber therein which is intercommunicated with the feeders, the mixing chamber being provided with a screw therein, the screw being connected with a motor; and a stirring and conveying unit connected with the material mixing unit, the stirring and conveying unit having a stirring and conveying chamber therein which is intercommunicated with the mixing chamber, the stirring and conveying chamber being provided with a screw therein, the screw being connected with a motor, the stirring and conveying unit further having a material inlet thereon.

Thereby, a solid powder material, a first material and a second material are respectively disposed in a solid material container and the feeders, and then guided into the mixing chamber to be well mixed for forming a mixture. The mixture is manufactured to form synthetic leather containing the solid powder material, enhancing the variation of the synthetic leather.

DETAILED DESCRIPTION OF THE PREFERRED EMBODIMENTS

Embodiments of the present invention will now be described, by way of example only, with reference to the accompanying drawings.

Figure 1:
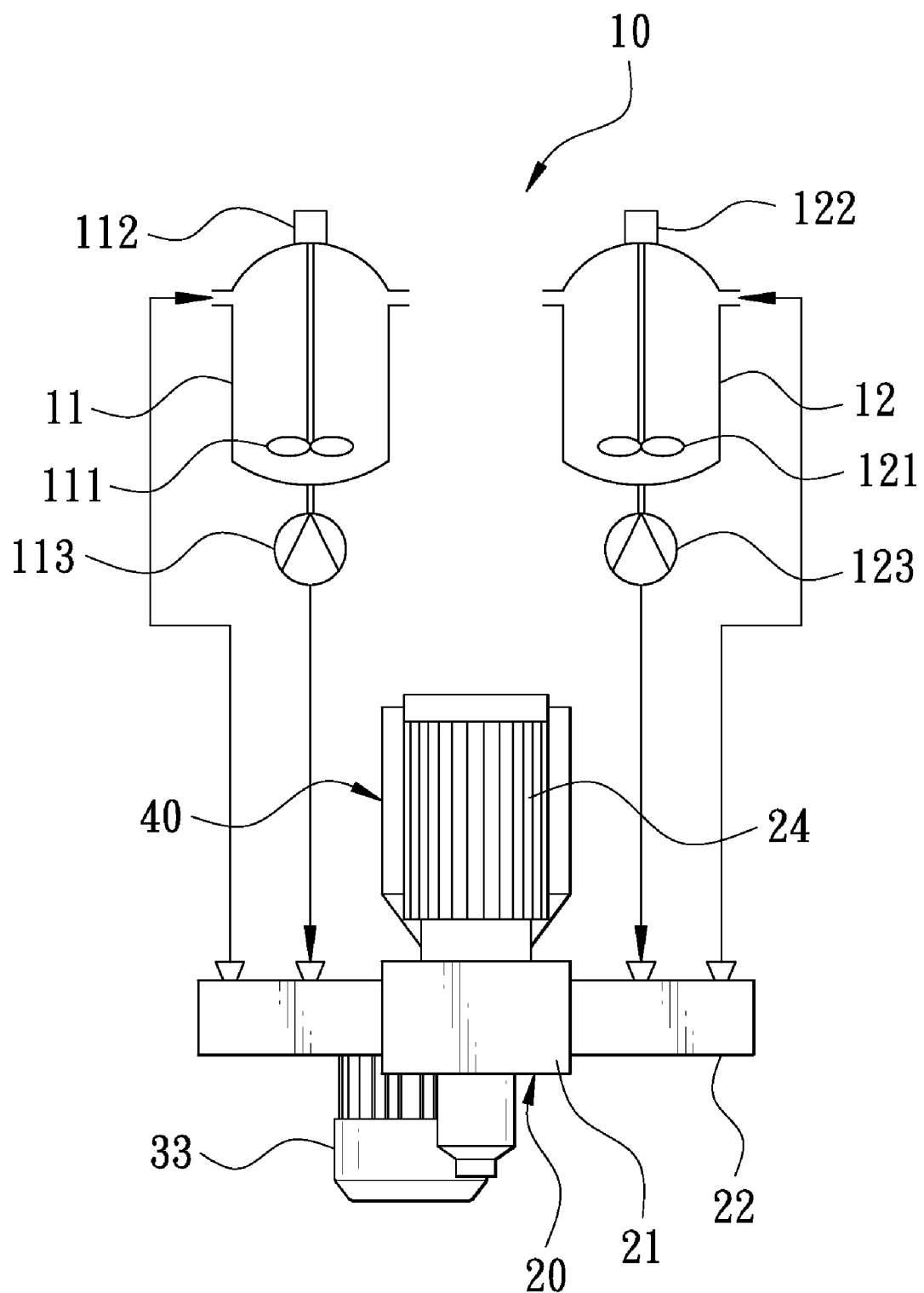
FIG. 1 is a schematic view of a mixing device of the present invention.

As shown in FIG. 1, a mixing device of the present invention comprises a plurality of metering output units 10, a material mixing unit 20, and a stirring and conveying unit 30.

The plurality of metering output units 10 comprise a first metering output unit 11 and a second metering output unit 12. The first metering output unit 11 comprises a stirrer 111 therein, and is connected to a motor 112 and provided with a quantitative pump 113 at a bottom thereof. The second metering output unit 12 comprises a stirrer 121 therein, and is connected to a motor 122 and provided with a quantitative pump 123 at a bottom thereof. The first and second metering output units 11 and 12 are driven by the motors 112 and 122.

Figure 2:
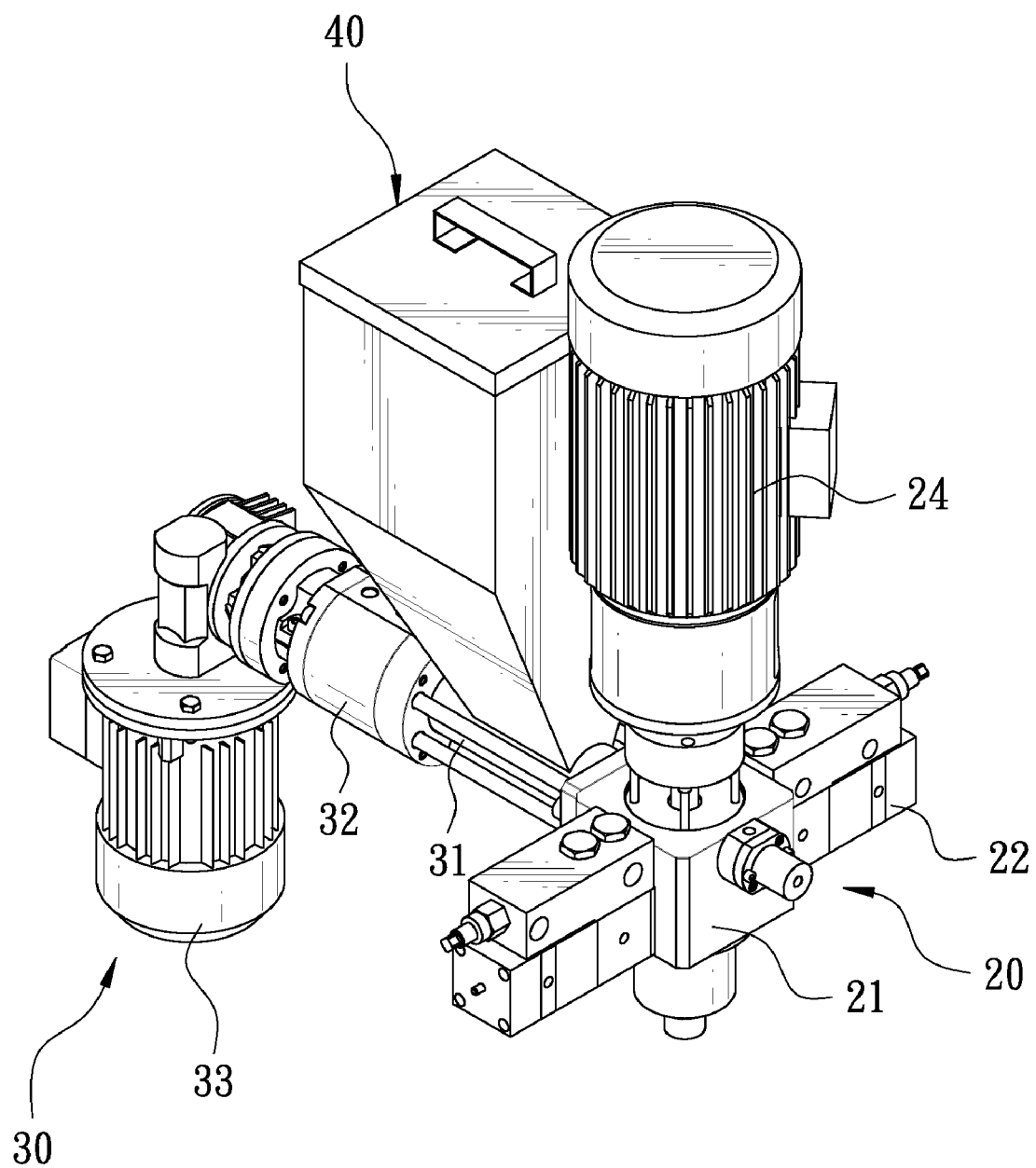
FIG. 2 is a perspective view of the mixing device of the present invention.
Figure 3:
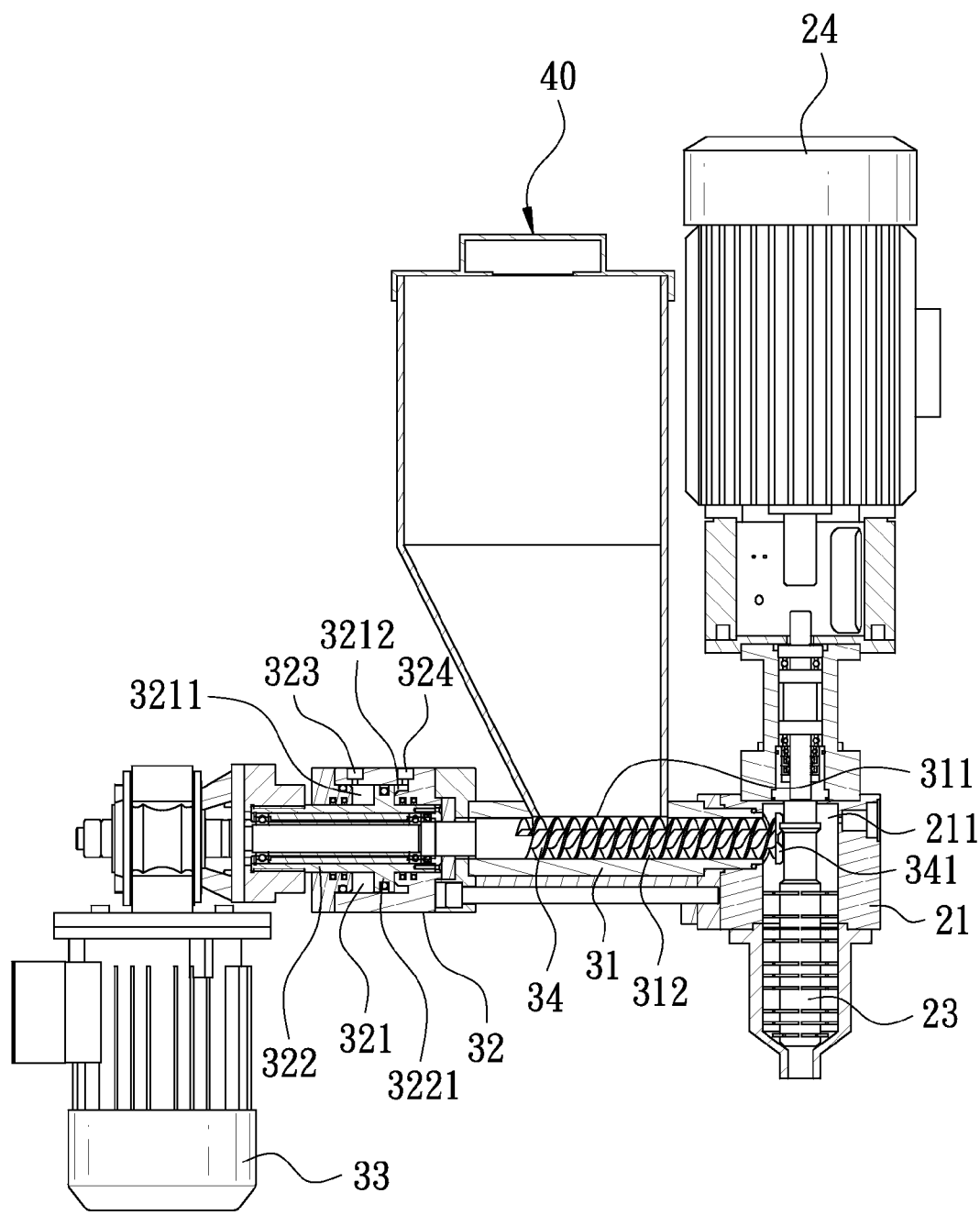
FIG. 3 is a cross-sectional view of the mixing device of the present invention.

FIG. 2 is a perspective view of the mixing device of the present invention. FIG. 3 is a cross-sectional view of the mixing device of the present invention. The material mixing unit 20 comprises a mixing body 21 and two feeders 22. The mixing body 21 is connected with the two feeders 22 and has a mixing chamber 211 therein which is intercommunicated with the two feeders 22. The mixing chamber 211 is provided with a screw 23 therein. The screw 23 is connected with a motor 24. The two feeders 22 are connected with the first and second metering output units 11 and 12, respectively.

The stirring and conveying unit 30 is connected with a solid material container 40 and the material mixing unit 20, respectively. The stirring and conveying unit 30 comprises a guide tube 31, an air cylinder 32, a motor 33 and a screw 34. The guide tube 31 is formed with a material inlet 311 at a circumferential side thereof and a stirring and conveying chamber 312 therein which is intercommunicated with the material inlet 311. The solid material container 40 is connected to the material inlet 311 of the guide tube 31 and intercommunicated with the stirring and conveying chamber 312. A first end of the guide tube 31 is connected to the material mixing unit 20. The stirring and conveying chamber 312 of the guide tube 31 is intercommunicated with the mixing chamber 211. A second end of the guide tube 31 is connected to the air cylinder 32. The air cylinder 32 has an air chamber 321 therein. The air chamber 321 is provided with a connecting tube 322 which is inserted through the air chamber 321. The connecting tube 322 is provided with a blocking ring 3221 outwardly. The blocking ring 3221 abuts against an inner wall of the air cylinder 32 and divides the air chamber 321 into a first air chamber 3211 and a second air chamber 3212. A circumferential side of the air cylinder 32 is formed with a first air aperture 323 and a second air aperture 324 to intercommunicate with the first air chamber 3211 and the second air chamber 3212. The connecting tube 322 is inserted through the air cylinder 32 and connected with the motor 33. The motor 33 is further connected with the screw 34 which is inserted through the guide tube 31 and the air cylinder 32. The screw 34 is provided with a baffle plate 341 at one side thereof with respect to the material mixing unit 20.

Figure 4:
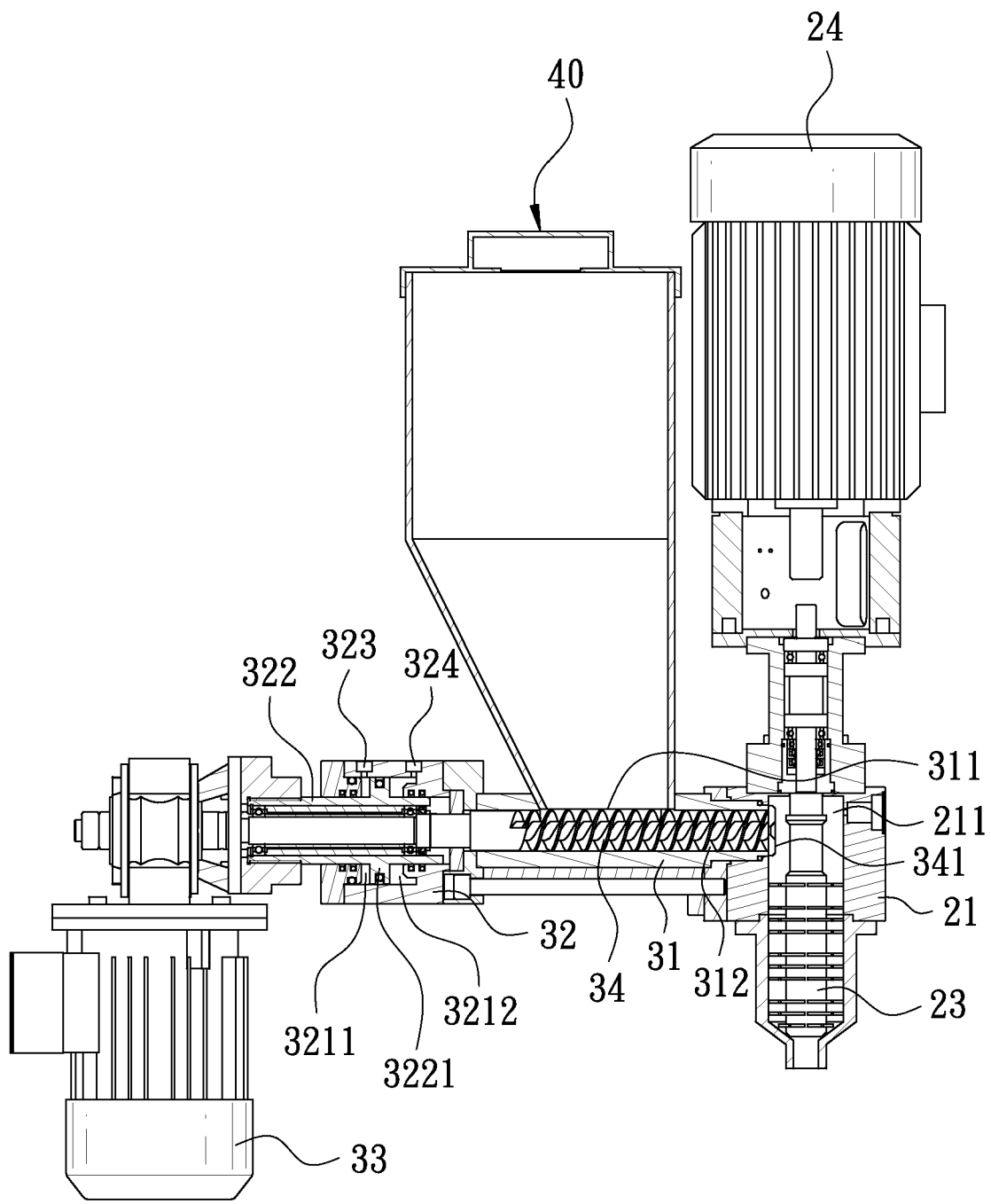
FIG. 4 is another cross-sectional view of the mixing device of the present invention.

FIG. 4 is another cross-sectional view of the material mixing unit and the stirring and conveying unit of the mixing device of the present invention. First, a first material which is isocynate polymer containing NCO, a second material which is hydroxyl compound containing OH, and a solid material to form a bright surface decoration are disposed in the first metering output unit 11, the second metering output unit 12, and the solid material container 40, respectively. The first material and the second material in the first metering output unit 11 and the second metering output unit 12 are injected into the material mixing unit 20 in a specific ratio via the quantitative pumps 113 and 123, while the solid material is conveyed into the mixing chamber 211 via the screw 34 of the stirring and conveying unit 30 so that the first material, the second material and the solid material are well mixed and stirred via the screw 23 of the material mixing unit 20 to form a mixture. The mixture is further manufactured to form synthetic leather containing the solid powder material which enhances the variation and value of the synthetic leather. Preferably, the solid material of the present invention may be bright powder, pearlized sand, mineral sand or the like. In addition, when the material mixing unit 20 is stopped or there is no need for adding the solid powder material, the air cylinder 32 will have the second air chamber 3212 filled with air via the second air aperture 324 so that the air pressure in the second air chamber 3212 is greater than that in the first air chamber 3211. The connecting tube 322 is moved towards the first air chamber 3211, which links the screw 34 to move and the baffle plate 341 to seal the open end of the guide tube 31 so as to block the solid powder material entering the mixing chamber 211. On the contrary, when the material mixing unit 20 is restarted, the air cylinder 32 will have the first air chamber 3211 filled with air via the first air aperture 323 so that the connecting tube 322 is moved towards the second air chamber 3212 and the baffle plate 341 disengages from the open end of the guide tube 31.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A mixing device for synthetic leather to joint with a solid powder material, comprising:
   a material mixing unit comprises a mixing body and at least two feeders;
   the mixing body being connected with the feeders and having a mixing chamber therein which is intercommunicated with the feeders;
   the mixing chamber being provided with a screw therein;
   the screw being connected with a motor;
   a stirring and conveying unit connected with the material mixing unit;
   the stirring and conveying unit having a stirring and conveying chamber therein which is intercommunicated with the mixing chamber;
   the stirring and conveying chamber being provided with a screw therein;
   the screw being connected with a motor;
   the stirring and conveying unit further having a material inlet;
   the stirring and conveying unit further comprises a guide tube and an air cylinder;
   the guide tube having an open end connected to the material mixing unit;
   the guide tube being formed with the material inlet at a circumferential side thereof and the stirring and conveying chamber therein which is intercommunicated with the material inlet;
   another end of the guide tube being connected to the air cylinder;
   the air cylinder being further connected with the motor of the stirring and conveying unit;
   the motor of the stirring and conveying unit being connected with the screw of the stirring and conveying unit; and
   the screw of the stirring and conveying unit being inserted through the air cylinder and the guide tube.

2. The mixing device for synthetic leather to joint with a solid powder material as claimed in claim 1, wherein the feeders are connected with a first metering output unit and a second metering output unit, the first metering output unit and the second metering output unit each being provided with a stirrer therein which is connected with a motor, the first metering output unit and the second metering output unit each further comprising a quantitative pump at a bottom thereof.

3. The mixing device for synthetic leather to joint with a solid powder material as claimed in claim 1, wherein the air cylinder further has an air chamber therein, the air chamber being provided with a connecting tube therein, the connecting tube being provided with a blocking ring outwardly, the blocking ring abutting against an inner wall of the air cylinder and dividing the air chamber into a first air chamber and a second air chamber, the screw of the stirring and conveying unit being inserted into the connecting tube, the connecting tube being inserted through the air cylinder and connected with the motor of the stirring and conveying unit, a circumferential side of the air cylinder being formed with a first air aperture and a second air aperture to intercommunicate with the first air chamber and the second air chamber.

4. The mixing device for synthetic leather to joint with a solid powder material as claimed in claim 1, wherein the screw of the stirring and conveying unit is provided with a baffle plate at one side thereof with respect to the material mixing unit, the baffle plate being adapted to seal the open end of the guide tube.

5. The mixing device for synthetic leather to joint with a solid powder material as claimed in claim 1, further comprising a solid material container, the solid material container being connected to the material inlet of the guide tube and intercommunicated with the stirring and conveying chamber.

* * * * *